(12) United States Patent
Beck et al.

(10) Patent No.: US 9,011,288 B2
(45) Date of Patent: Apr. 21, 2015

(54) MULTI-RATIO TRANSMISSION

(71) Applicant: ZF Friedrichshafen AG, Friedrichshafen (DE)

(72) Inventors: Stefan Beck, Eriskirch (DE); Timo Wehlen, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/376,618

(22) PCT Filed: Jan. 10, 2013

(86) PCT No.: PCT/EP2013/050337
§ 371 (c)(1),
(2) Date: Aug. 5, 2014

(87) PCT Pub. No.: WO2013/117363
PCT Pub. Date: Aug. 15, 2013

(65) Prior Publication Data
US 2015/0018164 A1    Jan. 15, 2015

(30) Foreign Application Priority Data

Feb. 6, 2012    (DE) .................... 10 2012 201 686

(51) Int. Cl.
*F16H 3/66*    (2006.01)
*F16H 3/62*    (2006.01)
(Continued)

(52) U.S. Cl.
CPC ... *F16H 3/62* (2013.01); *B60K 6/48* (2013.01); *F16H 3/66* (2013.01); *F16H 3/725* (2013.01); *F16H 37/04* (2013.01);
(Continued)

(58) Field of Classification Search
None
See application file for complete search history.

(56) References Cited

U.S. PATENT DOCUMENTS

| 4,395,925 A | 8/1983 | Gaus |
| 6,572,507 B1 | 6/2003 | Korkmaz et al. |

(Continued)

FOREIGN PATENT DOCUMENTS

| DE | 29 36 969 A1 | 4/1981 |
| DE | 199 12 480 A1 | 9/2000 |

(Continued)

OTHER PUBLICATIONS

German Search Report Corresponding to 10 2012 201 686.4 mailed Aug. 9, 2013, 6 pages.
German Search Report Corresponding to 10 2012 201 687.2 mailed Aug. 9, 2013, 6 pages.

(Continued)

*Primary Examiner* — Erin D Bishop
(74) *Attorney, Agent, or Firm* — Davis & Bujold, P.L.L.C.; Michael J. Bujold

(57) ABSTRACT

A multi-stage transmission with eight forward and one reverse gear, including input and output shafts, planetary gear sets, gear stages shift elements and shafts. The input shaft couples the carrier of gearset (P1) and, via clutch (15), can couple shaft (5), which couples the ring gear of gearset (P2) and which, via clutch (58), can couple shaft (8), which couples the sun gear of gearset (P3). The ring gear of gearset (P1) couples shaft (6) and the sun gear of gearset (P2). Shaft (3) couples the sun and ring gears of respective gearsets (P1, P3) and can couple, via brake (03), the housing (G). The carrier of gearset (P2) couples shaft (4), which can couple the output shaft via the gear stage (S1) and clutch (24). The carrier of gearset (P3) couples shaft (7), which couples gear stage (S2) and the output shaft. Clutch (46) can block gearset (P2).

18 Claims, 8 Drawing Sheets

(51) Int. Cl.
  *F16H 3/72* (2006.01)
  *F16H 37/04* (2006.01)
  *B60K 6/48* (2007.10)
  *F16H 3/44* (2006.01)

(52) U.S. Cl.
  CPC .... *F16H 2200/006* (2013.01); *F16H 2200/201* (2013.01); *F16H 2200/2043* (2013.01); *F16H 2003/442* (2013.01); *F16H 2200/0008* (2013.01); *B60Y 2304/01* (2013.01); *Y02T 10/6221* (2013.01)

(56) References Cited

U.S. PATENT DOCUMENTS

| | | |
|---|---|---|
| 7,549,942 B2 | 6/2009 | Gumpoltsberger |
| 7,699,743 B2 | 4/2010 | Diosi et al. |
| 8,210,981 B2 | 7/2012 | Bauknecht et al. |
| 2008/0090697 A1 | 4/2008 | Ortmann et al. |
| 2008/0242492 A1 | 10/2008 | Phillips et al. |
| 2009/0305837 A1 | 12/2009 | Hiraiwa |
| 2010/0035718 A1 | 2/2010 | Saitoh |
| 2010/0069191 A1 | 3/2010 | Swales et al. |
| 2010/0210399 A1 | 8/2010 | Wittkopp et al. |
| 2011/0124456 A1* | 5/2011 | Sung ............... 475/35 |
| 2011/0124457 A1* | 5/2011 | Sung ............... 475/53 |

FOREIGN PATENT DOCUMENTS

| | | |
|---|---|---|
| DE | 10 2004 023 949 A1 | 12/2005 |
| DE | 10 2004 038 516 A1 | 2/2006 |
| DE | 10 2005 010 210 A1 | 9/2006 |
| DE | 10 2006 001 746 A1 | 8/2007 |
| DE | 10 2006 001 760 A1 | 8/2007 |
| DE | 10 2006 006 637 A1 | 9/2007 |
| DE | 10 2008 051 177 A1 | 8/2009 |
| DE | 10 2008 000 428 A1 | 9/2009 |
| DE | 10 2009 009 300 A1 | 9/2009 |
| DE | 10 2009 018 958 A1 | 2/2011 |
| DE | 10 2009 047 265 A1 | 6/2011 |
| JP | 2009-270667 A | 11/2009 |

OTHER PUBLICATIONS

German Search Report Corresponding to 10 2012 201 690.2 mailed Aug. 12, 2013, 6 pages.
German Search Report Corresponding to 10 2012 201 689.9 mailed Aug. 12, 2013, 6 pages.
German Search Report Corresponding to 10 2012 201 692.9 mailed Aug. 6, 2013, 6 pages.
German Search Report Corresponding to 10 2012 201 685.6 mailed Aug. 7, 2013, 6 pages.
German Search Report Corresponding to 10 2012 201 684.8 mailed Aug. 22, 2013, 6 pages.
German Search Report Corresponding to 10 2012 201 678.3 mailed Aug. 22, 2013, 6 pages.
German Search Report Corresponding to 10 2012 201 682.1 mailed Aug. 22, 2013, 6 pages.
German Search Report Corresponding to 10 2012 201 681.3 mailed Aug. 22, 2013, 6 pages.
International Search Report Corresponding to PCT/EP2013/050337 mailed Mar. 22, 2013, 8 pages.
International Search Report Corresponding to PCT/EP2013/050338 mailed Mar. 22, 2013, 8 pages.
International Search Report Corresponding to PCT/EP2013/050340 mailed Mar. 22, 2013, 8 pages.
International Search Report Corresponding to PCT/EP2013/050341 mailed Mar. 22, 2013, 8 pages.
International Search Report Corresponding to PCT/EP2013/050344 mailed Mar. 22, 2013, 8 pages.
International Search Report Corresponding to PCT/EP2013/050345 mailed Mar. 22, 2013, 8 pages.
International Search Report Corresponding to PCT/EP2013/050347 mailed Mar. 27, 2013, 6 pages.
International Search Report Corresponding to PCT/EP2013/050349 mailed Mar. 27, 2013, 6 pages.
International Search Report Corresponding to PCT/EP2013/050350 mailed Mar. 27, 2013, 6 pages.
International Search Report Corresponding to PCT/EP2013/050782 mailed Feb. 27, 2013, 5 pages.
Written Opinion Corresponding to PCT/EP2013/050337 mailed Mar. 22, 2013, 7 pages.

* cited by examiner

| GEAR | ENGAGED SHIFT ELEMENTS ||||| TRANS. RATIO | GEAR STEP |
| | BRAKE | CLUTCH |||| | |
| | 03 | 46 | 15 | 24 | 58 | i | φ |
|---|---|---|---|---|---|---|---|
| 1 | ● | | ● | | ● | 5.084 | |
| 2 | ● | ● | | | ● | 3.214 | 1.582 |
| 3 | | ● | ● | | ● | 1.970 | 1.631 |
| 4 | | ● | | ● | ● | 1.582 | 1.245 |
| 5 | | | ● | ● | ● | 1.257 | 1.259 |
| 6 | | ● | ● | ● | | 1.000 | 1.257 |
| 7 | ● | | ● | ● | | 0.819 | 1.221 |
| 8 | ● | ● | | ● | | 0.632 | 1.296 |
| R | ● | | | ● | ● | -3.575 | 8.040 |

Fig. 7

MULTI-RATIO TRANSMISSION

This application is a National Stage completion of PCT/EP2013/050337 filed Jan. 10, 2013, which claims priority from German patent application serial no. 10 2012 201 686.4 filed Feb. 6, 2012.

FIELD OF THE INVENTION

The present invention relates to a multi-stage transmission, particularly an automatic transmission for a motor vehicle.

BACKGROUND OF THE INVENTION

Automatic transmissions, particularly those for motor vehicles, comprise, according to the prior art, planetary gear sets that are shifted by means of friction and/or shift elements, such as clutches and brakes, and usually are connected to a start-up element that is subject to a slip effect and optionally provided with a direct-drive clutch, such as a hydrodynamic torque converter or fluid coupling.

Automatic transmissions of this kind have been described extensively in the prior art and are subject to continuous development and improvement. Correspondingly, these transmissions are intended to provide an adequate number of forward gears and at least one reverse gear, as well as step changes that are very well suited for motor vehicles with a high overall gear ratio and favorable step changes. Furthermore, they are to allow for a high start-up ratio in the forward direction, and contain a direct gear. Moreover, automatic transmissions should not require any great structural complexity and a large number of shift elements, wherein, for a sequential gear-shifting modality, only one given shift element is to be activated and one shift element deactivated, respectively.

An automatic transmission of this kind is known, for example, from DE 199 12 480 B4 filed by the applicant. It comprises three single carrier planetary gear sets as well as three brakes and two clutches for shifting six forward gears and one reverse gear, one input shaft and one output shaft, wherein the carrier of the first planetary gear set is continuously connected to the ring gear of the second planetary gear set and the carrier of the second planetary gear set to the ring gear of the third planetary gear set, and the input shaft is directly connected to the sun gear of the second planetary gear set.

Further, the known transmission provides that the input shaft can be connected to the sun gear of the first planetary gear set by means of the first clutch and to the carrier of the first planetary gear set by means of the second clutch, wherein the sun gear of the first planetary gear set can be connected to the housing of the transmission by means of the first brake and the carrier of the first planetary gear set can be connected to the housing of the transmission by means of the second brake, and wherein the sun gear of the third planetary gear set can be connected to the housing of the transmission by means of the third brake. The output shaft of the transmission is continuously connected to the carrier of the third planetary gear set and to the ring gear of the first planetary gear set.

SUMMARY OF THE INVENTION

The object underlying the present invention seeks to describe a multi-stage transmission with, seen from an axial perspective, minimal assembly space requirements, such that any incorporation of the transmission and optionally any hybridization of a transmission as a front-transverse system are made possible. Moreover, effectiveness with regard to drag and gearing losses is to be improved.

According to the invention, this task is achieved by the characteristics as described below.

Correspondingly, we presently propose a multi-stage transmission having an input and an output disposed inside a housing. The transmission further comprises three planetary gear sets, designated below as first, second and third planetary gear sets, at least eight rotatable shafts—designated below as input shaft, output shaft, third, fourth, fifth, sixth, seventh and eighth shafts—, first and second spur gear stages in connection with a countershaft, that is disposed parallel relative to the longitudinal axis of the planetary gear sets, serving as an output shaft of the transmission, and five shift elements, comprising a brake and clutches whose selective engagement creates different transmission ratios between the input shaft and the output shaft, such that, preferably, it is possible to implement eight forward gears and one reverse gear.

The planetary gear sets are preferably designed as minus planetary gear sets. As generally known in the art, a simple minus planetary gear set comprises a sun gear, a ring gear and a carrier, upon which the planetary gears are supported in a rotating fashion, meshing with the sun gear and the ring gear, respectively. This way, when the carrier is held in place, the ring gear has a direction of rotation that is opposite to that of the sun gear. In contrast, a simple plus planetary gear set, on the other hand, comprises a sun gear, a ring gear and a carrier upon which internal and external planetary gears are supported in a rotating fashion, wherein all the internal planetary gears mesh with the sun gear and all the external planetary gears mesh with the ring gear, and wherein each interior planetary gear meshes with one external planetary gear, respectively. This is why, when the carrier is held in place, the ring gear has the same direction of rotation as the sun gear, thereby resulting in a positive stationary transmission ratio.

Furthermore, seen from a radial perspective, two of the planetary gear sets of the transmission are preferably disposed above one another, resulting in a very short structural length, whereby it is possible to install the transmission in passenger cars with a front-transverse design.

Seen from a radial perspective, the second planetary gear set is disposed over the first planetary gear set, wherein, seen from an axial perspective, the planetary gear sets are disposed in the order of first planetary gear set/second planetary gear set, then the third planetary gear set. In the context of further embodiments of the invention, the axial order of the planetary gear sets can be in any chosen sequence; moreover, seen from an axial perspective, the planetary gear sets can be disposed one after the other.

According to the invention, the input shaft is connected to the carrier of the first planetary gear set and can be detachably connected by means of a first clutch to the fifth shaft, which is connected to the ring gear of the second planetary gear set, and by means of a third clutch to the eighth shaft, which is connected to the sun gear of the third planetary gear set, wherein the ring gear of the first planetary gear set is connected to the sixth shaft, which is connected to the sun gear of the second planetary gear set.

Moreover, the carrier of the second planetary gear set is connected to the fourth shaft that can be detachably connected to the output shaft by means of the first spur gear stage and a second clutch. The fourth shaft therein can be connected to a first spur gear of the first spur gear stage whose second spur gear can be detachably connected to the output shaft by means of the second clutch. As an alternate option, the fourth shaft can be detachably connected to the first spur gear of the first spur gear stage by means of the second clutch, wherein the second spur gear of the first spur gear stage is connected to the output shaft.

Instead of, or in addition to, the first spur gear stage, the fourth shaft can be detachably connected via a chain, a belt, or one or several other structural components, to the output shaft by means of at least one clutch.

Furthermore, the carrier of the third planetary gear set is connected to the seventh shaft, which is connected to the output shaft by means of the second spur gear stage, wherein the third shaft of the transmission is connected to the sun gear of the first planetary gear set and the ring gear of the third planetary gear set, and can be coupled to the housing of the transmission by means of the brake.

Instead of, or in addition to, the second spur gear stage, the seventh shaft can be detachably connected to the output shaft by means of a chain, a belt or one or several other structural components via at least one clutch.

A further clutch is provided according to the invention, engagement of which enables blocking the second planetary gear set.

According to a first embodiment of the invention, the further clutch is designed as a clutch that detachably connects the sixth shaft to the fourth shaft, whereby blocking of the second planetary gear set can be achieved by coupling the sun gear of the second planetary gear set to the carrier of the second planetary gear set.

Within the scope of a further embodiment of the invention, the further clutch can be embodied as a clutch that detachably connects the sixth shaft to the fifth shaft, whereby the blocking of the second planetary gear set can be achieved by coupling the ring gear of the second planetary gear set to the sun gear of the second planetary gear set.

The further clutch can, furthermore, be embodied as a clutch that detachably connects the fifth shaft to the fourth shaft, whereby the blocking of the second planetary gear set can be achieved by coupling the carrier of the second planetary gear set to the ring gear of the second planetary gear set.

By designing the multi-stage transmission as envisioned according to the invention, suitable transmission ratios result, particularly for passenger vehicles, as well as an increased overall gear ratio of the multi-stage transmission, yielding improved driving comfort and significantly lowered fuel consumption.

Moreover, using the multi-stage transmission according to the invention, the minimal number of shift elements ensures a considerable reduction of structural complexity. Using the multi-stage transmission, it is advantageously possible to implement a start-up process with a hydrodynamic converter, an external start-up clutch or also with other suitable external start-up elements. Also conceivable is the possibility of a start-up using a start-up element that is integrated in the transmission. Preferably, a shift element that is actuated in the first forward gear and in the reverse gear is suitable for this.

Moreover, the multi-stage transmission according to the invention provides good efficiency in the main driving gears with regard to drag and gearing losses.

Moreover, minimal torques are present in the shift elements and planetary gear sets of the multi-stage transmission, whereby wear and tear are advantageously reduced. Moreover, due to minimal torques, it is possible to work with minimal dimensions, thereby, by reducing the needed assembly space and lowering the related costs. Moreover, low speeds are also present with regard to the shafts, shift elements and planetary gear sets.

In addition, the transmission according to the invention is designed such that, seen from an axial perspective, the required structural assembly space is minimal, whereby hybridization of the transmission as a front-wheel drive system is made possible.

The output shaft is preferably connected to a differential that distributes the torque over the drive wheels. A planetary gear set can be disposed between the input shaft of the differential and the input shaft. This helps increase the ratio of the output shaft relative to the differential output shafts, whereby a smaller design for the ratio of the previously mentioned spur gear stages and/or mechanical structural components is possible, thus providing structural advantages, such as smaller axial distances or smaller tooth widths.

BRIEF DESCRIPTION OF THE DRAWINGS

The invention will be described in further detail below, based on the enclosed figures. The figures show as follows:

FIG. 7: depicts an exemplary shift pattern for a multi-stage transmission according to FIGS. 1 to 6;

DETAILED DESCRIPTION OF THE PREFERRED EMBODIMENTS

Figure 1:
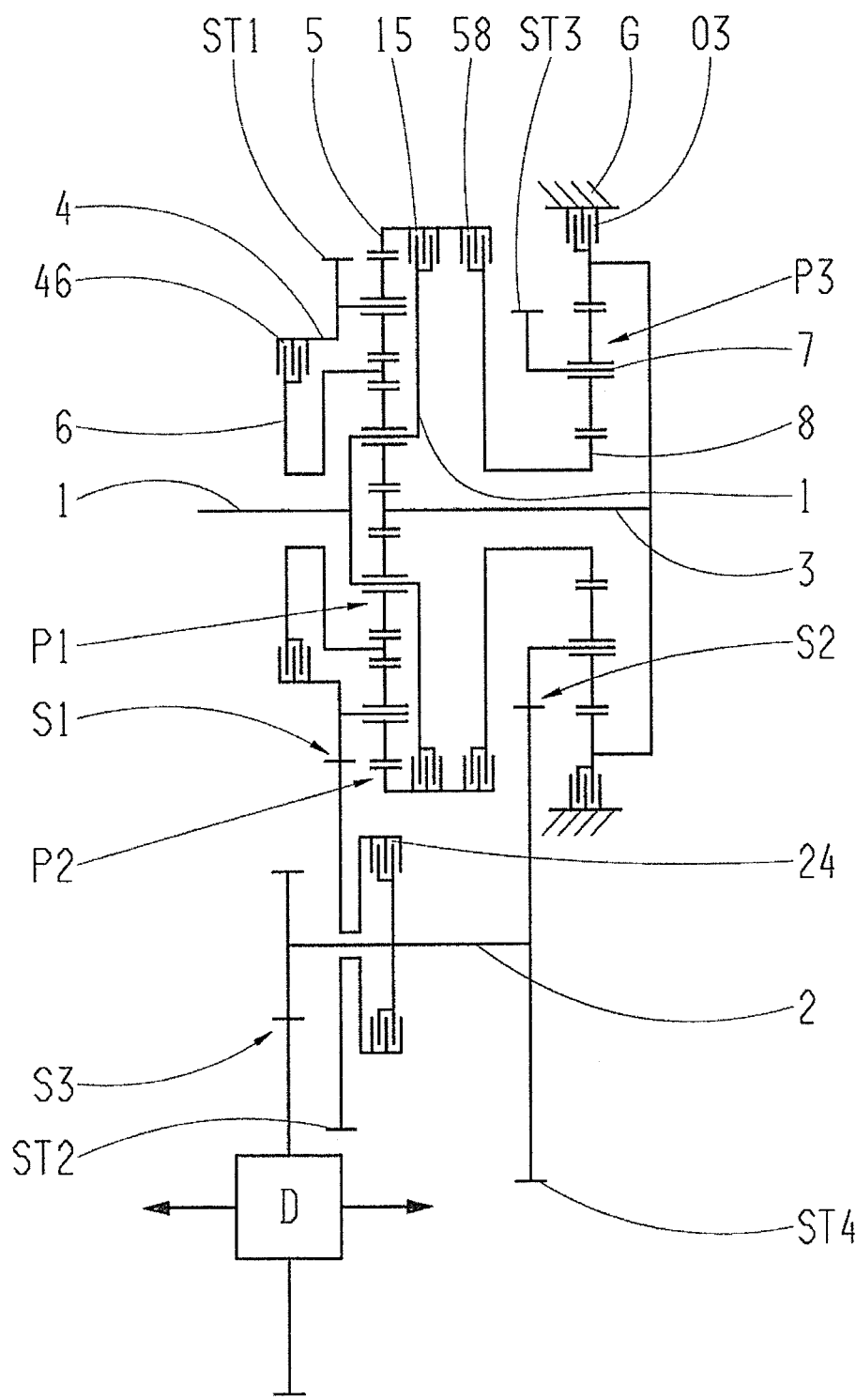
FIG. 1: a depiction of a schematic view of a preferred embodiment of a multi-stage transmission according to the invention.

FIG. 1 is a depiction of a multi-stage transmission according to the invention, having a first planetary gear set P1, a second planetary gear set P2 and a third planetary gear set P3, a first spur gear stage S1 and a second spur gear stage S2 in connection with a countershaft, which is arranged parallel relative to the longitudinal axis of the coaxially arranged planetary gear sets P1, P2, P3 and serves as output shaft 2 of the transmission that is disposed inside a housing G.

Seen from a radial perspective, in the shown example, the second planetary gear set P2 is disposed over the first planetary gear set P1, thereby advantageously reducing the structural length of the transmission. Seen from an axial perspective, the planetary gear sets P1, P2, P3 are disposed in the order of first planetary gear set P1/second planetary gear set P2, and then the third planetary gear set P3.

At least one planetary gear set of the transmission can be embodied therein as a plus planetary gear set, if, simultaneously, the carrier and ring gear connections are switched and the value of the stationary transmission ratio is increased by 1 in comparison to the embodiment as minus planetary gear set.

Five shift elements are provided, as can be seen in FIG. 1; these are namely a brake 03 and four clutches 15, 24, 58 and 46. The spatial arrangement of the shift elements is arbitrary and only limited by the dimensions and the external shape. The clutches and the brake of the transmission are preferably embodied as frictional and/or lamellar shift elements.

These shift elements allow for selectively shifting eight forward gears and one reverse gear. The multi-stage transmission according to the invention includes a total of at least eight rotatable shafts, wherein the input shaft constitutes the first shaft 1, and the output shaft constitutes the second shaft 2 of the transmission.

According to the invention, in the context of the multi-stage transmission according to FIG. 1, it is provided that the input shaft 1 is connected to the carrier of the first planetary gear set P1 and can be detachably connected by means of a first clutch 15 to the fifth shaft 5 which is connected to the ring gear of the second planetary gear set P2 and can be detachably connected by means of a third clutch 58 to the eight shaft 8 which is connected to the sun gear of the third planetary gear set P3, wherein the ring gear of the first planetary gear set P1 is connected to the sixth shaft 6 that is connected to the sun gear of the second planetary gear set P2. The third shaft 3 is connected to the sun gear of the first planetary gear set P1 and ring gear of the third planetary gear set P3 and can be coupled to the housing G of the transmission by means of the brake 03.

Referring to FIG. 1, the carrier of the second planetary gear set P2 is connected to the fourth shaft 4, which is connected to the first spur gear ST1 of the first spur gear stage S1 whose second spur gear ST2 can be detachably connected to the output shaft 2 by means of a second clutch 24, wherein the carrier of the third planetary gear set P3 is connected to the seventh shaft 7 that is connected to the first spur gear ST3 of the second spur gear stage S2, wherein the second spur gear ST4 of the second spur gear stage S2 is connected to the output shaft 2.

Seen from an axial perspective, the first and third clutches 15, 58 can be disposed adjacent to each other, having a common external disc carrier.

In addition, a further clutch is provided on the transmission according to the invention, and, by engaging the same, the second planetary gear set P2 can be blocked. In the example as shown in FIG. 1, the further clutch is embodied as a fourth clutch 46 that detachably connects the sixth shaft 6 and the fourth shaft 4, thereby allowing for the blocking of the second planetary gear set P2 by coupling the sun gear of the second planetary gear set P2 to the carrier of the second planetary gear set P2.

Figure 2:
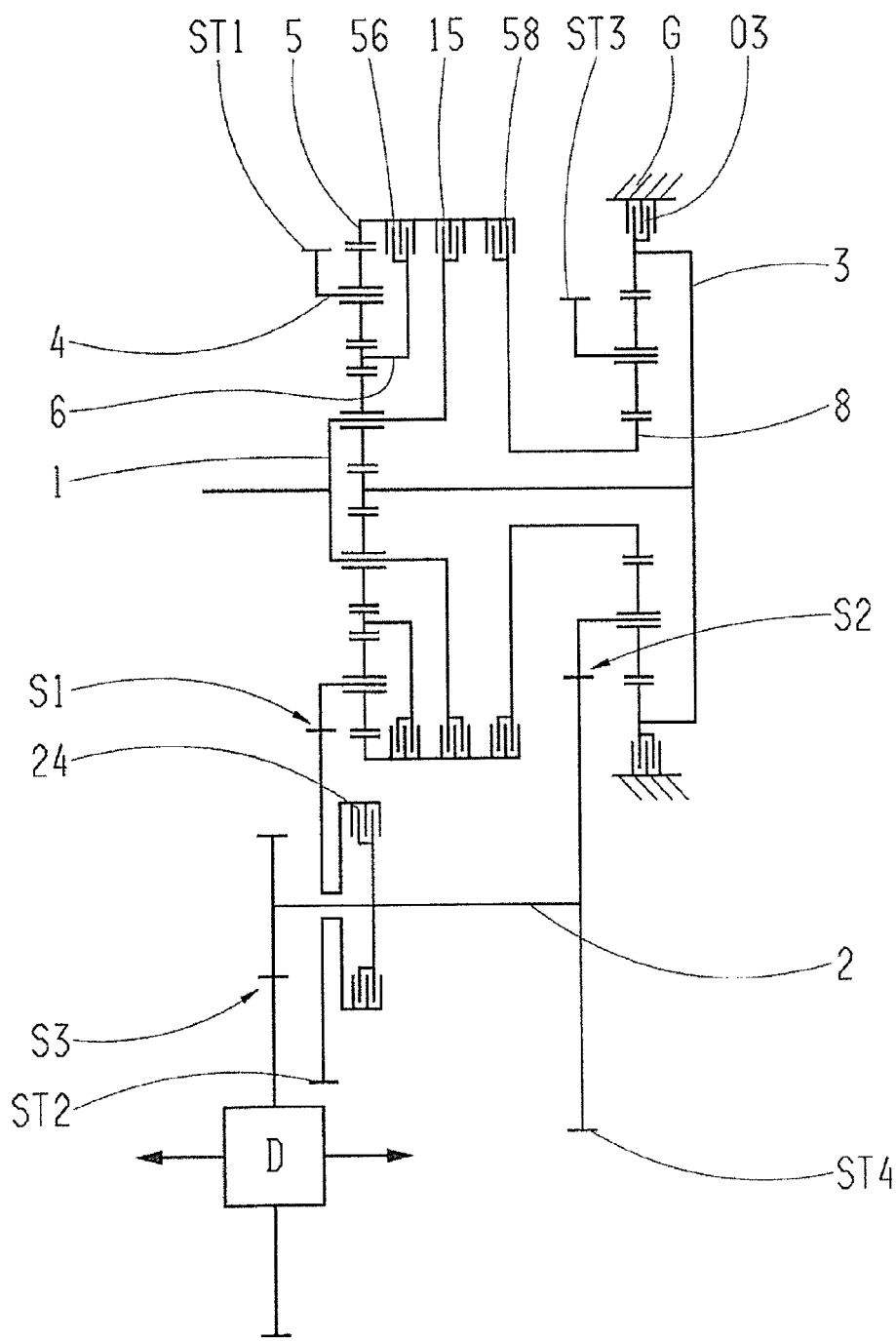
FIG. 2: a depiction of a schematic view of a second preferred embodiment of a multi-stage transmission according to the invention.

In the scope of a further embodiment of the invention that is the subject-matter of FIG. 2, the further clutch can be designed as a fifth clutch 56 that detachably connects the sixth shaft 6 to the fifth shaft 5, such that the blocking of the second planetary gear set can be achieved by coupling the ring gear of the second planetary gear set P2 to the sun gear of the second planetary gear set P2. Seen from an axial perspective, the first, third and fifth clutches 15, 58, 56 therein can be disposed adjacently, relative to one another, having a common external disc carrier.

Figure 3:
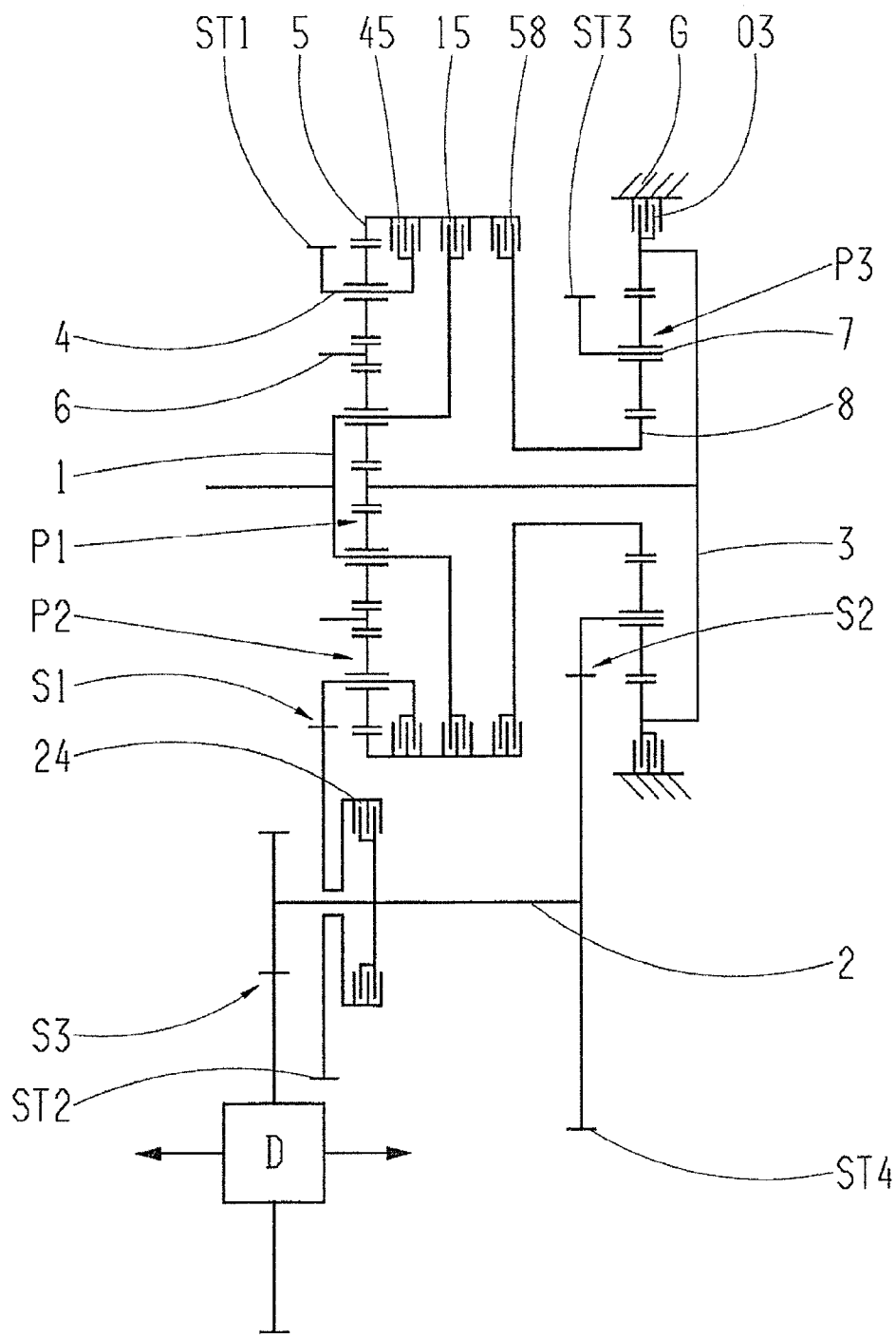
FIG. 3: a depiction of a schematic view of a third preferred embodiment of a multi-stage transmission according to the invention.

In reference to FIG. 3, the further clutch can be embodied as the sixth clutch 45 that detachably connects the fifth shaft 5 to the fourth shaft 4, such that the blocking of the second planetary gear set can be achieved by coupling the carrier of the second planetary gear set P2 to the ring gear of the second planetary gear set P2. Seen from an axial perspective, the first, third and sixth clutches 15, 58, 45 can be disposed adjacently, relative to one another, having a common external disc carrier.

Figure 4:
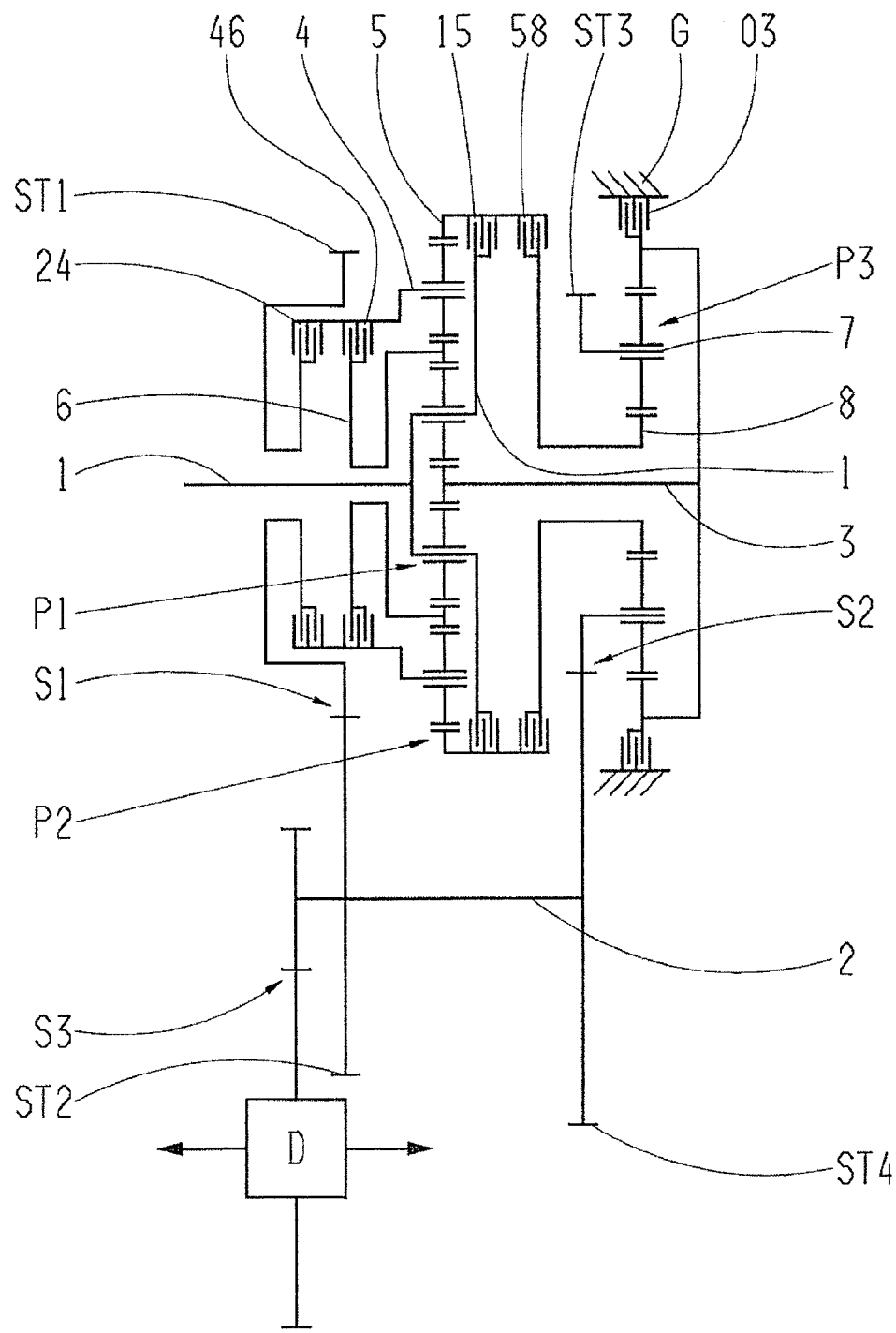
FIG. 4: a depiction of a schematic view of a fourth preferred embodiment of a multi-stage transmission according to the invention.

The transmission as shown in FIG. 4 differs from the embodiment according to FIG. 1 in that the fourth shaft 4 of the transmission can be detachably connected to the first spur gear ST1 of the first spur gear stage S1 by means of the second clutch 24, wherein the second spur gear ST2 of the first spur gear stage S1 is connected to the output shaft 2.

Figure 5:
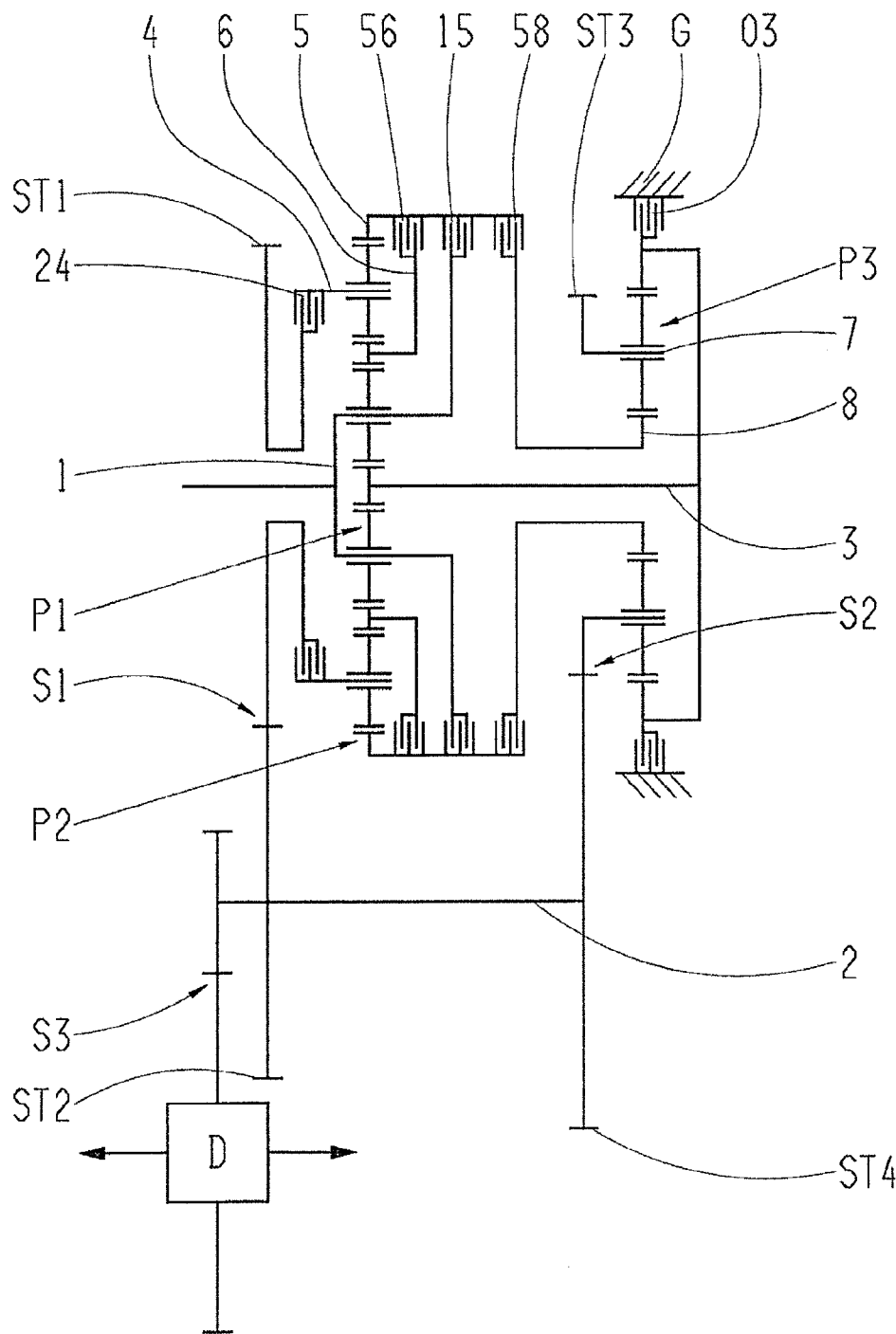
FIG. 5: a depiction of a schematic view of a fifth preferred embodiment of a multi-stage transmission according to the invention.

The subject-matter of FIG. 5 is an embodiment that differs from the embodiment according to FIG. 2 in that, by analogy to the example according to FIG. 4, the fourth shaft 4 can be detachably connected to the first spur gear ST1 of the first spur gear stage S1 by means of the second coupling 24, wherein the second spur gear ST2 of the first spur gear stage S1 is connected to the output shaft 2.

Figure 6:
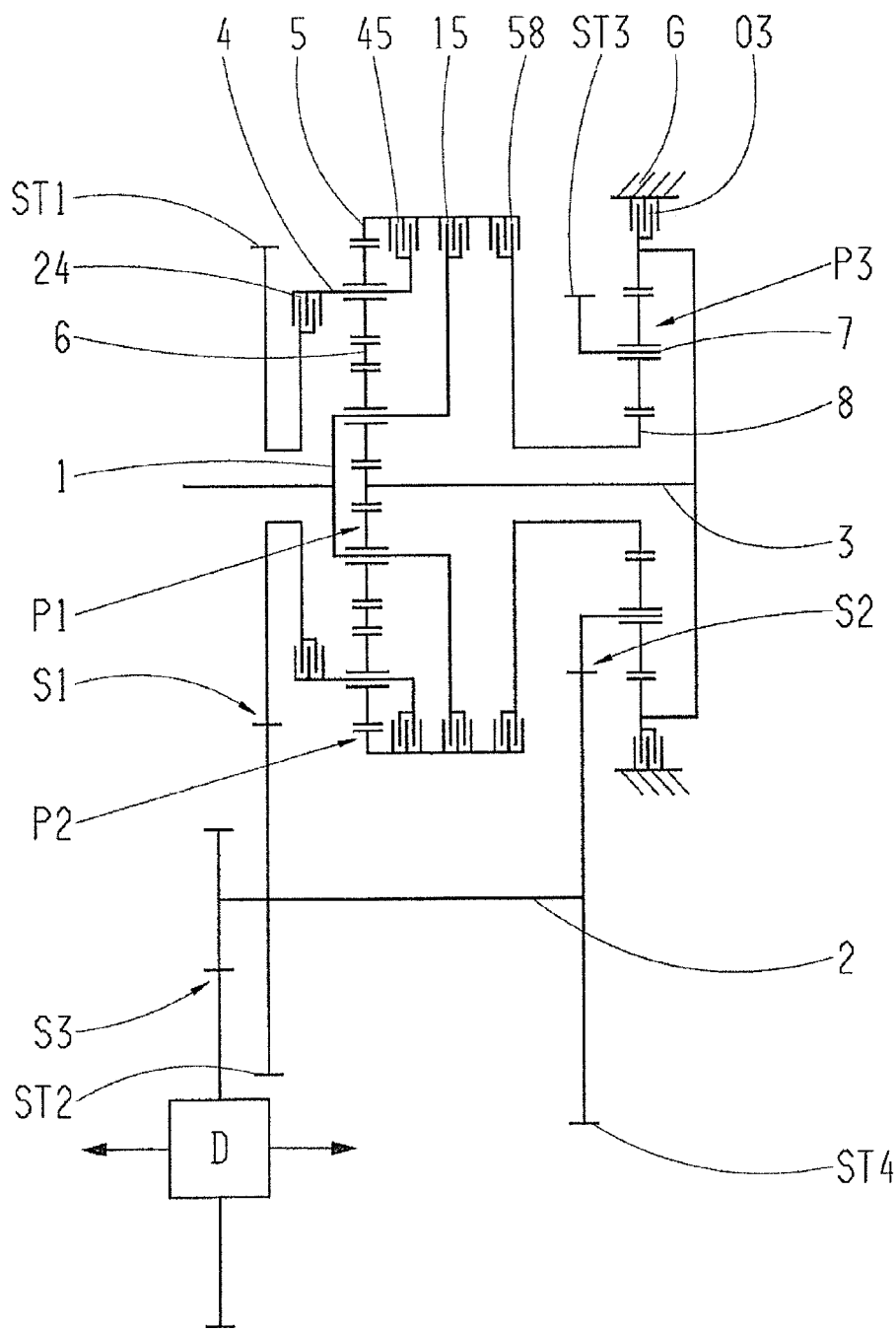
FIG. 6: a depiction of a schematic view of a sixth preferred embodiment of a multi-stage transmission according to the invention.

Furthermore, FIG. 6 depicts an embodiment that corresponds to the embodiment according to FIG. 3 with the difference, however, that the fourth shaft 4 of the transmission can be detachably connected to the first spur gear ST1 of the first spur gear stage S1 by means of the second clutch 24, wherein the second spur gear ST2 of the first spur gear stage S1 is connected to the output shaft 2.

Figure 11:
FIG. 11: diagrammatically shows output shaft of the transmission is connected to the input shaft of a differential by means of at least one planetary gear set.

In the embodiments according to FIGS. 1 to 6, a further spur gear stage S3 is disposed downstream of the transmission, which is connected to the differential D of the motor vehicle. As diagrammatically shown in FIG. 11, the output shaft of the transmission can be connected to the input shaft of a differential D by means of at least one planetary gear set.

In the context of an advantageous development of the invention, it is possible to envision only the second clutch 24 and the third clutch 58 as frictional shift elements with permanent slip capability, whereby countermeasures targeting rotational non-uniformity can be omitted.

FIG. 7 depicts an exemplary shift pattern of a multi-stage transmission according to FIGS. 1 to 6. Three shift elements are engaged for each gear. The shift pattern depicts, in an exemplary manner, the respective transmission ratios i of the individual gear stages and the gear increments and/or step changes $\phi$ to be determined from this for the next higher gear, wherein the value 8.040 represents the spread of the ratios of the transmission.

In the shown example, the values for the stationary transmission ratios of the planetary gear sets P1, P2, P3 embodied as minus planetary gear sets are $-1.720$, $-1.630$ and $-1.580$, respectively, wherein with ratios of the first and second spur gear stages S1, S2 are 1.000 and 1.970, respectively. FIG. 7 demonstrates that, with sequential shifting, only one shift element must be activated, and one shift element must be deactivated, respectively, as two adjacent gear steps use two shift elements jointly. Furthermore, it is also visible that a great spread of ratios is achieved with small gear increments.

If a fourth clutch 46 is provided that detachably connects the fourth shaft 4 to the sixth shaft 6, as in the embodiments according to FIGS. 1 and 4, the first forward gear results from engaging the brake 03 and the first and third clutches 15, 58, the second forward gear by engaging the brake 03 and the third and fourth clutches 58, 46, the third forward gear by engaging the first, third and fourth clutch 15, 58, 46, the fourth forward gear by engaging the second, third and fourth clutches 24, 58, 46, the fifth forward gear by engaging the first, second and third clutches 15, 24, 58, the sixth forward gear, which is embodied as a direct gear, by engaging the first, second and fourth clutches 15, 24, 46, the seventh forward gear by engaging the brake 03 and the first and second clutches 15, 24, and the eighth forward gear results from the engaging the brake 03 and the second and fourth clutches 24, 46, wherein the reverse gear results from engaging the brake 03 and the second and third clutches 24, 58.

The shift pattern for the embodiments as shown in FIGS. 2 and 5 differs from the shift pattern according to FIG. 7 only insofar as the fourth clutch 46 is replaced by the fifth clutch 56, wherein, in the case of a transmission according to FIGS. 3 and 6, the fourth clutch 46 is replaced by the sixth clutch 45.

Due to the fact that the brake 03 and the clutch 58 are engaged in the first forward gear and in the reverse gear, these shift elements can be utilized as start-up elements.

Depending on the shift logic, the invention envisions, even with the same transmission diagram, different gear increments, which is why variations that are specific to the application and/or vehicle are possible.

Figure 8:
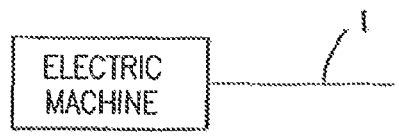
FIG. 8: diagrammatically shows an electrical machine disposed on the input shaft of the multi-stage transmission according to the invention.
Figure 9:
FIG. 9: diagrammatically shows a clutch provided between an engine and the multi-stage transmission according to the invention.

As a matter of principle, it is possible to dispose an electrical machine or a further drive source on each shaft of the transmission according to the invention. In the context of a particularly advantageous development of the invention, it is possible to envision an electrical machine that is disposed on the input shaft 1 and directly connected to the input shaft 1 as diagrammatically shown in FIG. 8. It is possible therein to provide a seventh clutch that allows for decoupling the internal combustion engine from the transmission as diagrammatically shown in FIG. 9, whereby it is advantageously possible to operate the totality of the gears of the transmission by electrical means alone.

Figure 10:
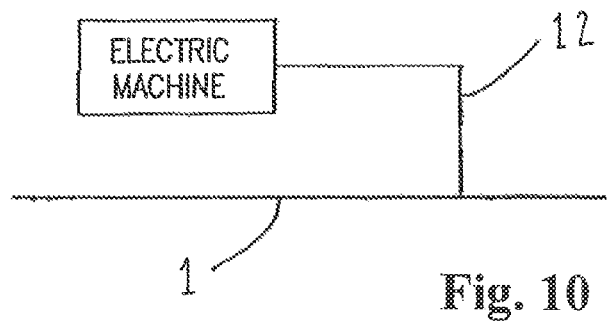
FIG. 10: diagrammatically shows an electrical machine disposed parallel to the input shaft of the multi-stage transmission according to the invention.

As an alternate option to the direct connection of the electrical machine to the input shaft, it is possible for the electrical machine to be disposed in an axis-parallel fashion relative to the input shaft 1 and connected to the input shaft 1 by means of a gear step or a chain drive 12 as diagrammatically shown in FIG. 10, wherein a seventh clutch can be optionally provided by which the internal combustion engine can be decoupled from the transmission.

According to the invention, it is possible to provide additional freewheels at any suitable location of the multi-stage transmission, such as, for example, between a shaft and the housing or in order to connect two shafts, if necessary.

According to the invention, it is possible to dispose an axle differential and/or a distributor differential on the drive side or output side.

Advantageous developments provide for separating the input shaft 1 from the drive motor by a clutch element, if necessary, wherein a hydrodynamic converter, a hydraulic clutch, a dry start-up clutch, a wet start-up clutch, a magnetic powder clutch or a centrifugal clutch can be used as the clutch element. It is also possible to dispose such a start-up element in the direction of the flow of force downstream of the transmission, wherein, in that case, the input shaft 1 is permanently connected to the crankshaft of the drive motor.

The multi-stage transmission according to the invention allows, moreover, for disposing a torsional vibration damper between the drive motor and the transmission.

In the context of a further embodiment according to the invention, that is presently not shown, each shaft, preferably the input shaft 1 or the output shaft 2, can have disposed thereupon a brake that is free of wear and tear, such as, for example, a hydraulic or electrical retarder or the like, which is of particular significance for applications in commercial vehicles. Moreover, it is possible to provide an auxiliary drive on each shaft, preferably on the input shaft 1 or output shaft 2, for driving additional assemblies.

The used frictional shift elements can be designed as clutches or brakes with power-shifting capacity. In particular, it is possible to use force-locking clutches or brakes, such as, for example, lamellar clutches, band brakes and/or cone clutches. In addition, the used shift elements can be designed as form-locking shift elements.

REFERENCE NUMERALS

1 First shaft, input shaft
2 Second shaft, output shaft
3 Third shaft
4 Fourth shaft
5 Fifth shaft
6 Sixth shaft
7 Seventh shaft
8 Eighth shaft
03 Brake
15 First clutch
24 Second clutch
45 Sixth clutch
46 Fourth clutch
56 Fifth clutch
58 Third clutch
D Differential
G Housing
P1 First planetary gear set
P2 Second planetary gear set
P3 Third planetary gear set
S1 First spur gear stage
S2 Second spur gear stage
S3 Third spur gear stage
ST1 First spur gear of the first spur gear stage S1
ST2 Second spur gear of the first spur gear stage S1
ST3 First spur gear of the second spur gear stage S2
ST4 Second spur gear of the second spur gear stage S2
i Transmission ratio
φ Step change

The invention claimed is:

1. A multi-stage automatic transmission for a motor vehicle, the transmission comprising:
   an input shaft (1) and an output shaft (2);
   first, second and third planetary gear sets (P1, P2, P3), each of the first, the second and the third planetary gear sets comprising a sun gear, a ring gear and a carrier;
   first and second spur gear stages (S1, S2) being connected to a countershaft disposed parallel to a longitudinal axis of the first, the second and the third planetary gear sets (P1, P2, P3) and serving as the output shaft (2) of the transmission, and the first and second spur gear stages (S1, S2) being disposed inside a housing (G);
   at least third, fourth, fifth, sixth, seventh and eight rotatable shafts (3, 4, 5, 6, 7, 8);
   at least five shift elements (03, 15, 24, 45, 46, 56, 58) comprising a brake (03) and first, second, third and fourth clutches (15, 24, 45, 46, 56, 58) whose selective engagement results in different transmission ratios between the input shaft (1) and the output shaft (2) so that eight forward gears and one reverse gear are implementable;
   the input shaft (1) being connected to the carrier of the first planetary gear set (P1), the input shaft (1) being detachably connectable, by engagement of the first clutch (15), to the fifth shaft (5) which is connected to the ring gear of the second planetary gear set (P2), and the fifth shaft (5) being detachably connectable to the eight shaft (8)

which is connected to the sun gear of the third planetary gear set (P3) by engagement of the third clutch (58);

the ring gear of the first planetary gear set (P1) being connected to the sixth shaft (6) which is also connected to the sun gear of the second planetary gear set (P2);

the third shaft (3) being connected to the sun gear of the first planetary gear set (P1) and the ring gear of the third planetary gear set (P3) and the third shaft (3) being connectable to the housing (G) of the transmission by engagement of the brake (03);

the carrier of the second planetary gear set (P2) being connected to the fourth shaft (4), and the fourth shaft (4) being detachably connectable to the output shaft (2) by the first spur gear stage (S1) and the second clutch (24);

the carrier of the third planetary gear set (P3) being connected to the seventh shaft (7) that is connected to the first spur gear (ST3) of the second spur gear stage (S2);

the second spur gear (ST4) of the second spur gear stage (S2) being connected to the output shaft (2);

the fourth clutch (46, 56, 45) being provided, and the second planetary gear set (P2) being blockable by the engagement of the fourth clutch (46, 56, 45).

2. The multi-stage transmission according to claim 1, wherein the fourth clutch (46) detachably connects the sixth shaft (6) to the fourth shaft (4) whereby, when the fourth clutch (46) is engaged, the second planetary gear set (P2) is blocked due to coupling of the carrier of the second planetary gear set (P2) with the sun gear of the second planetary gear set (P2).

3. The multi-stage transmission according to claim 1, wherein the fourth clutch (56) detachably connects the fifth shaft (5) to the sixth shaft (6) whereby, when the fourth clutch(56) is engaged, the second planetary gear set (P2) is blocked due to coupling of the sun gear of the secondary planetary gear set (P2) with the ring gear of the second planetary gear set (P2).

4. The multi-stage transmission according to claim 1, wherein the fourth clutch (45) detachably connects the fifth shaft (5) to the fourth shaft (4) whereby, when the fourth clutch (45) is engaged, the second planetary gear set (P2) is blocked due to coupling of the carrier of the secondary planetary gear set (P2) with the ring gear of the second planetary gear set (P2).

5. The multi-stage transmission according to claim 1, wherein the fourth shaft (4) is connected to a first spur gear (ST1) of the first spur gear stage (S1) and a second spur gear (ST2) is detachably connectable to the output shaft (2) by the second clutch (24).

6. The multi-stage transmission according to claim 1, wherein the fourth shaft (4) is detachably connected to a first spur gear (ST1) of the first spur gear stage (S1) by the second clutch (24), and a second spur gear (ST2) of the first spur gear stage (S1) is connected to the output shaft (2).

7. The multi-stage transmission according to claim 1, wherein the first, the second and the third planetary gear sets (P1, P2, P3) are configured as minus planetary gear sets.

8. The multi-stage transmission according to claim 1, wherein, seen from a radial perspective, the second planetary gear set (P2) is disposed over and surrounds the first planetary gear set (P1).

9. The multi-stage transmission according to claim 8, wherein seen from an axial perspective, the first, the second and the third planetary gear sets (P1, P2, P3) are disposed in an order of both the first planetary gear set (P1) and the second planetary gear set (P2), and then the third planetary gear set (P3).

10. The multi-stage transmission according to claim 9, wherein a fifth clutch is provided by which an internal combustion engine is decouplable from the transmission, whereby a totality of gears of the transmission are operable by electrical means alone.

11. The multi-stage transmission according to claim 1, wherein an electrical machine is either disposed on the input shaft of the transmission and directly connected to the input shaft, or is disposed axially parallel relative to the input shaft and connected to the input shaft by either a gear step or a chain drive.

12. The multi-stage transmission according to claim 1, wherein the fourth clutch (46) detachably connects the fourth shaft (4) to the sixth shaft (6), a first forward gear is implemented by engagement of the brake (03) and the first and the third clutches (15, 58), a second forward gear is implemented by engagement of the brake (03) and the third and the fourth clutches (58, 46), a third forward gear is implemented by engagement of the first, the third and the fourth clutches (15, 58, 46), a fourth forward gear is implemented by engagement of the second, the third and the fourth clutches (24, 58, 46), a fifth forward gear is implemented by engagement of the first, the second and the third clutches (15, 24, 58), a sixth forward gear is implemented by engagement of the first, the second and the fourth clutches (15, 24, 46), a seventh forward gear is implemented by engagement of the brake (03) and the first and the second clutches (15, 24), an eighth forward gear is implemented by engagement of the brake (03) and the second and the fourth clutches (24, 46), and the reverse gear results from engagement of the brake (03) and the second and the third clutches (24, 58).

13. The multi-stage transmission according to claim 1, wherein the fourth clutch (56) detachably connects the sixth shaft (6) to the fifth shaft (5).

14. The multi-stage transmission according to claim 1, wherein the fourth clutch (45) detachably connects the fifth shaft (5) to the fourth shaft (4).

15. The multi-stage transmission according to claim 1, wherein at least one mechanical structural component, belt and chain is disposed either instead of, or additionally to, at least one of the first and the second spur gear stage for the transmission of torque.

16. The multi-stage transmission according to claim 1, wherein the output shaft (2) is connected to an input shaft of a differential by at least one planetary gear set.

17. A multi-stage automatic transmission for a motor vehicle, the transmission comprising:

an input shaft (1) and an output shaft (2);

first, second and third planetary gear sets (P1, P2, P3), each of the first, the second and the third planetary gear sets comprising a sun gear, a ring gear and a carrier;

first and second spur gear stages (S1, S2) being connected to a countershaft which is disposed parallel to a longitudinal axis of the first, the second and the third planetary gear sets (P1, P2, P3) and serving as the output shaft (2) of the transmission, the first and second spur gear stages (S1, S2) being disposed inside a housing (G);

at least third, fourth, fifth, sixth, seventh and eight rotatable shafts (3, 4, 5, 6, 7, 8);

at least five shift elements (03, 15, 24, 45, 46, 56, 58) comprising a brake (03) and first, second, third and fourth clutches (15, 24, 45, 46, 56, 58) and selective engagement of the at least five shift elements results in different transmission ratios between the input shaft (1) and the output shaft (2) such that eight forward gears and one reverse gear are implementable;

the input shaft (1) being continuously connected to the carrier of the first planetary gear set (P1) and the input shaft (1) being connectable, via the first clutch (15), to the fifth shaft (5);

the output shaft (2) being continuously connected to a second spur gear (ST4) of the second spur gear stage (32);

the third shaft (3) being continuously connected to the sun gear of the first planetary gear set (P1) and the ring gear of the third planetary gear set (P3) and the third shaft (3) being connectable, via engagement of the brake (03), to the housing (G) of the transmission;

the fourth shaft (4) being continuously connected to the carrier of the second planetary gear set (P2), and the fourth shaft (4) being connectable, via the first spur gear stage (S1) and the second clutch (24), to the output shaft (2);

the fifth shaft (5) being continuously connected to the ring gear of the second planetary gear set (P2) and the fifth shaft (5) being connectable, via the third clutch (58), to the eight shaft (8);

the sixth shaft (6) being continuously connected to both the ring gear of the first planetary gear set (P1) and the sun gear of the second planetary gear set (P2);

the seventh shaft (7) being continuously connected to the carrier of the third planetary gear set (P3) and a first spur gear (ST3) of the second spur gear stage (ST2);

the eight shaft (8) being continuously connected to the sun gear of the third planetary gear set (P3); and the fourth clutch (46, 56, 45) being engageble to block the second planetary gear set (P2).

18. The multi-stage transmission according to claim 17, wherein a first forward gear is implemented by engagement of the brake (03) and the first and the third clutches (15, 58), a second forward gear is implemented by engagement of the brake (03) and the third and the fourth clutches (58, 46), a third forward gear is implemented by engagement of the first, the third and the fourth clutches (15, 58, 46), a fourth forward gear is implemented by engagement of the second, the third and the fourth clutches (24, 58, 46), a fifth forward gear is implemented by engagement of the first, the second and the third clutches (15, 24, 58), a sixth forward gear is implemented by engagement of the first, the second and the fourth clutches (15, 24, 46), a seventh forward gear is implemented by engagement of the brake (03) and the first and the second clutches (15, 24), an eighth forward gear is implemented by engagement of the brake (03) and the second and the fourth clutches (24, 46), and the reverse gear results from engagement of the brake (03) and the second and the third clutches (24, 58).

* * * * *